(12) United States Patent  
Saito

(10) Patent No.: US 8,885,191 B2  
(45) Date of Patent: Nov. 11, 2014

(54) PRINT CONTROL APPARATUS PERFORMING A FINISHING PROCESS AFTER PRINTING, PRINT CONTROL METHOD THEREOF, AND COMPUTER-READABLE MEDIUM

(75) Inventor: Kazuyuki Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 12/788,208

(22) Filed: May 26, 2010

(65) Prior Publication Data

US 2010/0302585 A1 Dec. 2, 2010

(30) Foreign Application Priority Data

May 28, 2009 (JP) ................................. 2009-129197

(51) Int. Cl.  
*G06F 15/00* (2006.01)  
*G06K 1/00* (2006.01)  
*G06F 3/12* (2006.01)  
*G06K 15/00* (2006.01)

(52) U.S. Cl.  
CPC ............ *G06F 3/1285* (2013.01); *G06F 3/1215* (2013.01); *G06F 3/124* (2013.01); *G06F 3/1241* (2013.01); *G06F 3/1282* (2013.01); *G06F 3/121* (2013.01); *G06F 3/1264* (2013.01)  
USPC .......... 358/1.15; 358/1.9; 358/1.13; 358/1.18

(58) Field of Classification Search  
None  
See application file for complete search history.

(56) References Cited

U.S. PATENT DOCUMENTS

| 5,859,711 A | 1/1999 | Barry et al. |
| 2001/0048833 A1 | 12/2001 | Katsuda et al. |

(Continued)

FOREIGN PATENT DOCUMENTS

| JP | 7-078058 | 3/1995 |
| JP | 2000-112689 A | 4/2000 |

(Continued)

*Primary Examiner* — Ming Hon  
(74) *Attorney, Agent, or Firm* — Canon USA, Inc. IP Division

(57) ABSTRACT

A print control apparatus includes a print job generation unit configured to generate a print job, wherein a final product of the print job comprises a plurality of print parts, wherein the print job generation unit is further configured to cause one or more printers to print the plurality of print parts, and to control said one or more printers to output at least a first one of the plurality of print parts to a first sheet discharge unit and to output at least a second one of the plurality of print parts to a second sheet discharge unit different from the first sheet discharge unit according to a print instruction, a job information sheet creation unit configured to create for each of the print parts, a job information sheet indicating that the print part concerned is related to at least one other print part of the print job and is also configured to cause the or one said printer to print the job information sheet, and a sheet discharge control unit configured to control said one or more printers so that each of the job information sheets is discharged to a sheet discharge unit to which a print part corresponding to the job information sheet is discharged.

9 Claims, 16 Drawing Sheets

(56) References Cited

U.S. PATENT DOCUMENTS

| | | | |
|---|---|---|---|
| 2001/0055123 A1* | 12/2001 | Ryan et al. | 358/1.12 |
| 2002/0034392 A1* | 3/2002 | Baum et al. | 396/564 |
| 2003/0030846 A1 | 2/2003 | Mori et al. | |
| 2004/0139164 A1* | 7/2004 | Kanaya | 709/206 |
| 2004/0156064 A1* | 8/2004 | Owen et al. | 358/1.13 |
| 2004/0169876 A1* | 9/2004 | Takahashi | 358/1.12 |
| 2005/0094178 A1* | 5/2005 | Anno | 358/1.13 |
| 2005/0275860 A1* | 12/2005 | Nagarajan et al. | 358/1.13 |
| 2007/0229878 A1* | 10/2007 | Pandit et al. | 358/1.15 |

FOREIGN PATENT DOCUMENTS

| | | |
|---|---|---|
| JP | 2001-205899 | 7/2001 |
| JP | 2001-205899 A | 7/2001 |
| JP | 2003-296070 A | 10/2003 |
| JP | 2005-135005 A | 5/2005 |
| JP | 2006-301741 A | 11/2006 |
| JP | 2008-073907 A | 4/2008 |

* cited by examiner

PRINT CONTROL APPARATUS PERFORMING A FINISHING PROCESS AFTER PRINTING, PRINT CONTROL METHOD THEREOF, AND COMPUTER-READABLE MEDIUM

BACKGROUND OF THE INVENTION

1. Field of the Invention

The present invention relates to a print control method for performing a finishing process after printing, such as bookbinding and cutting processes, by using a device other than a printer.

2. Description of the Related Art

In some of conventional print on demand (POD) systems, a printer only performs printing, and a finisher is separately provided to perform finishing processes such as bookbinding and cutting processes. In such a system, it is necessary for an operator to convey printed products printed by the printer to the finisher and thus necessary for print jobs to be sorted. As a conventional printer, Japanese Patent Application Laid-Open No. 2001-205899 discusses a printer which outputs a job information page on which print job information related to the print job is printed at an end of the page. The job information page is output after outputting the print job so that the operator can determine how the print job is to be sorted and to determine the content of the job. Japanese Patent Application Laid-Open No. 7-78058 discusses a printer which prints a list of job information when all jobs have been completed or when a predetermined number of jobs have been completed, along with output of print data of each job. The printed product of each job is then discharged to a main tray, and the list of job information is discharged to a sub-tray.

However, according to such conventional techniques, it is difficult for an operator, who conveys the sheets to the finisher by part constituting a final product, to determine whether each of the printed products printed out by part constitute the same final product.

SUMMARY OF THE INVENTION

The present invention is directed to a mechanism which can easily determine whether each of printed products output by part is a printed product that constitutes a same final product.

According to an aspect of the present invention, a print control apparatus includes a print job generation unit configured to generate a print job, wherein a final product of the print job comprises a plurality of print parts, wherein the print job generation unit is further configured to cause one or more printers to print the plurality of print parts, and to control said one or more printers to output at least a first one of the plurality of print parts to a first sheet discharge unit and to output at least a second one of the plurality of print parts to a second sheet discharge unit different from the first sheet discharge unit according to a print instruction, a job information sheet creation unit configured to create for each of the print parts, a job information sheet indicating that the print part concerned is related to at least one other print part of the print job and is also configured to cause the or one said printer to print the job information sheet, and a sheet discharge control unit configured to control said one or more printers so that each of the job information sheets is discharged to a sheet discharge unit to which a print part corresponding to the job information sheet is discharged.

According to the present invention, an operator can easily determine whether printed products output by part constitute the same final product. Therefore, errors caused by the operator during conveyance of the parts to the finisher can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
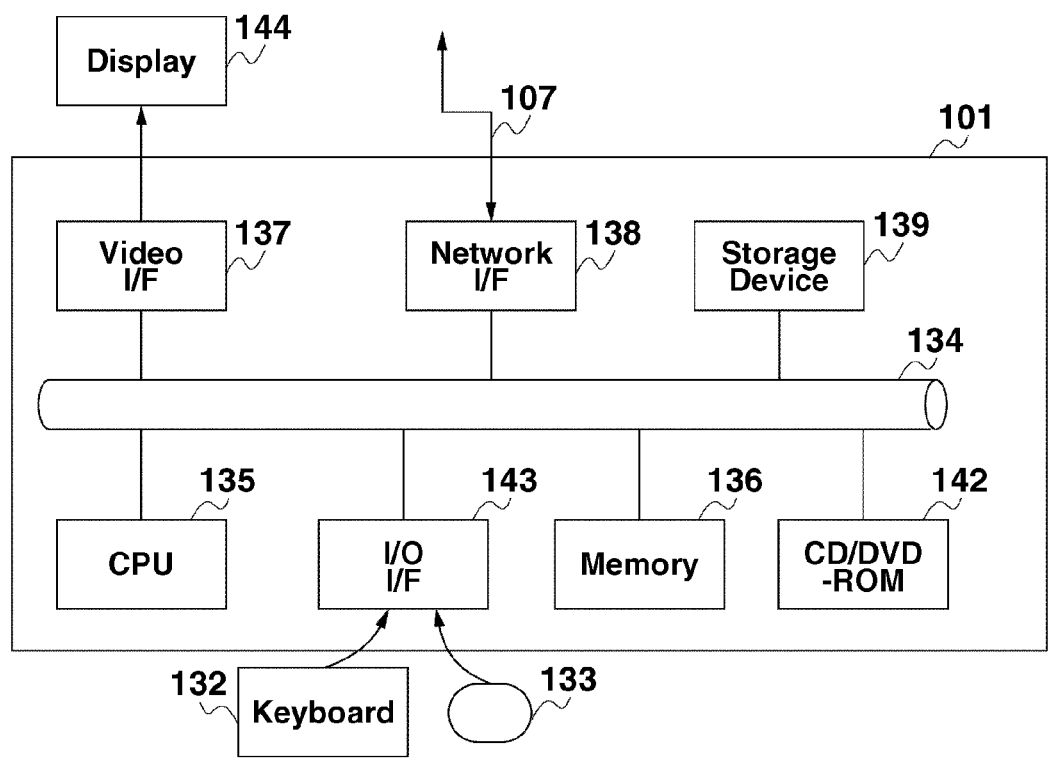
FIG. 1 illustrates a hardware configuration of a computer.

FIG. 1 illustrates a hardware configuration of a print control apparatus included in a printing system according to an exemplary embodiment of the present invention. Referring to FIG. 1, a computer module 101 is connected to an input apparatus such as a keyboard 132 and a mouse 133, i.e., a pointing device, and to a display apparatus 144. A network interface (I/F) 138 connects the computer module 101 to other computer apparatuses in the system via a network 107 such as a local area network (LAN) and a wide area network (WAN).

The computer module 101 further includes a processor unit (i.e., a central processing unit, CPU) 135, a memory unit 136, a video I/F, and an input/output (I/O) I/F 143 for connecting to the keyboard 132 and the mouse 133. The memory unit 136 includes a random access memory (RAM) or a read-only memory (ROM). A storage device 139 includes a hard disk drive (HDD) and a floppy disk drive (not illustrated). The storage device 139 may include a magnetic tape drive (not illustrated). A compact disk (CD)-ROM drive 142 is provided as a non-volatile data source. The computer module 101 uses the components from the CPU 135 to the I/O I/F 143 and performs communication via an operation system (OS) or an interconnection bus 134.

Software which realizes steps illustrated in flowcharts according to the present invention are stored in a computer-readable storage medium in the computer that includes the storage device such as described above. Such software is loaded from the computer-readable storage medium to the computer module 101 and executed by the CPU 135 of the computer module 101. The computer can thus function as an apparatus for controlling printing of a document by using the computer program thereon.

Figure 11:
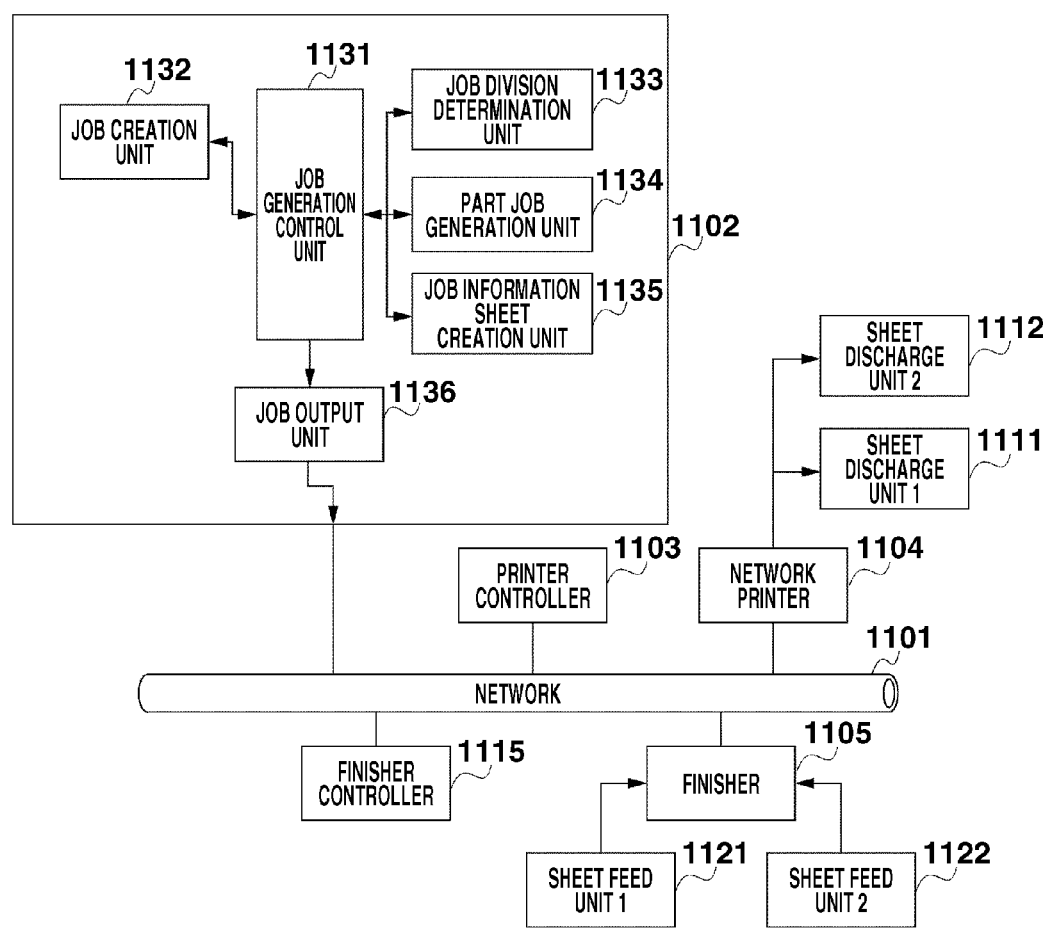
FIG. 11 illustrates a configuration of a system including a computer.

FIG. 11 illustrates an example of a configuration of a print control apparatus 1102, a network printer (hereinafter referred to as a printer) 1104, and a finisher 1105 according to the present exemplary embodiment. The print control apparatus 1102 includes a job generation control unit 1131, a job creation unit 1132, a job division determination unit 1133, a part job generation unit 1134, a job information sheet creation unit 1135, and a job output unit 1136. The printer 1104 includes a sheet discharge unit 1 (1111) and a sheet discharge unit 2 (1112). The finisher 1105 includes a sheet feed unit 1 (1121) and a sheet feed unit 2 (1122). The printer 1104 and the finisher 1105 are separate devices and are not connected by a sheet conveyance path. It is thus necessary for an operator to convey printed products discharged to the discharge unit of the printer to the sheet feed unit of the finisher 1105.

Figure 12:
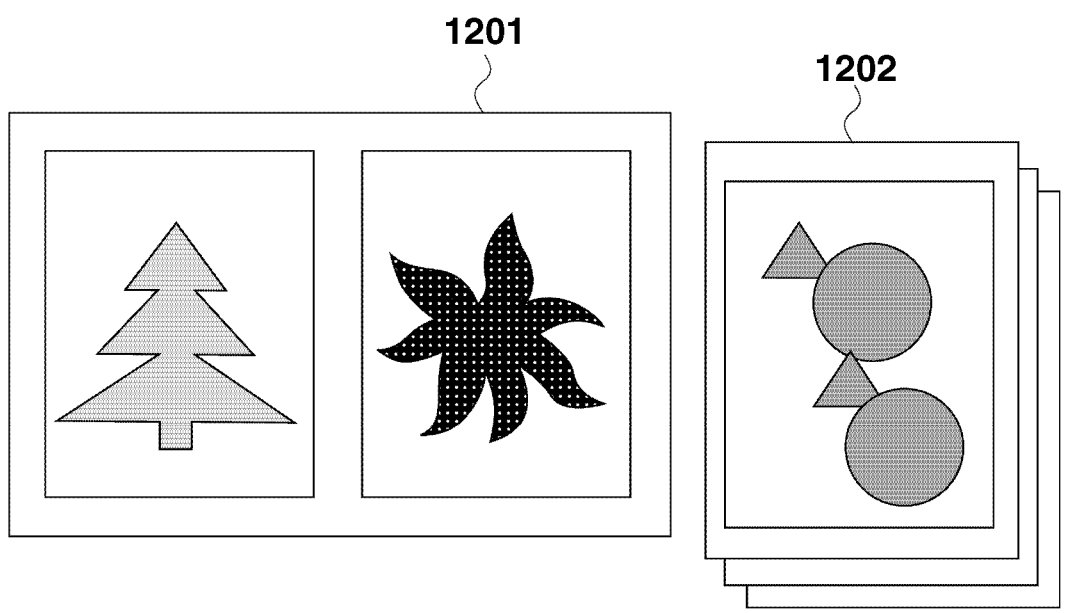
FIG. 12 illustrates an example of a document to be printed according to an exemplary embodiment of the present invention.

Processing performed by the print control apparatus 1102 according to the present exemplary embodiment will be described below with reference to a flowchart illustrated in FIG. 2. Each of the steps in the flowchart of the processing performed by the print control unit 1102 is stored as a program in a storage unit such as the RAM, the ROM, or the HDD and is executed by the CPU 135. FIG. 12 illustrates an example of a document to be printed according to the present exemplary embodiment.

In step S201, the job creation unit 1132 creates a print job of the document illustrated in FIG. 12 according to print settings input by an operator and creates job information using the print settings. The job creation unit 1132 then stores the print job and the job information in an internal storage device. The job information includes information and the print settings which are unique to the job, such as job identification (ID), a user name, a job name, bar coded data of the job ID, an output paper size, a final paper size, finishing setting, Nup setting, a sheet feed destination, and a sheet discharge destination. In step S202, the job generation control unit 1131 receives selection of the print job to be executed from a user and transmits the stored print job to the job division determination unit 1133. In step S203, the job division determination unit 1133 determines whether to divide the received print job into a plurality of jobs for each part.

Figure 3:
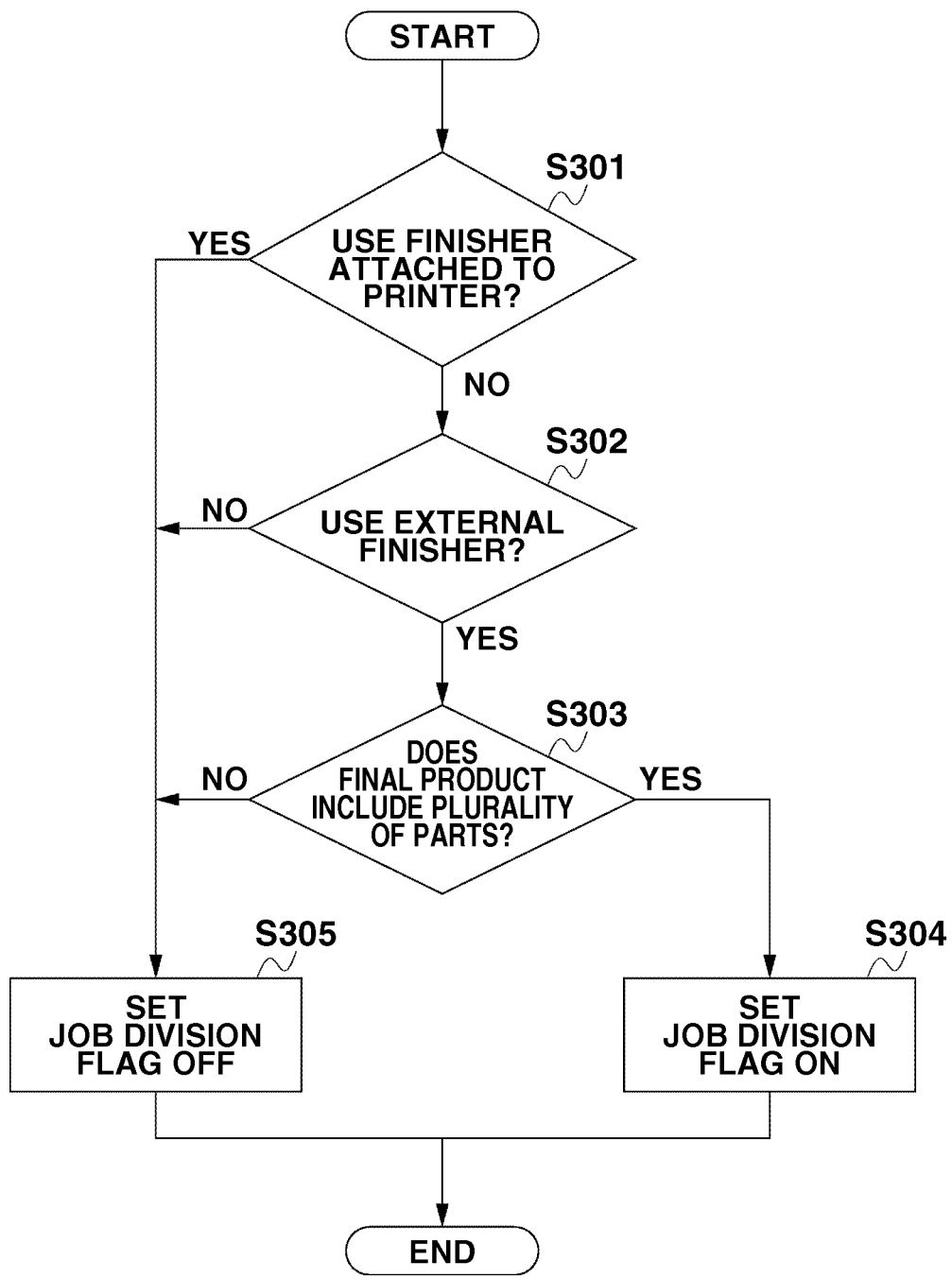
FIG. 3 is a flowchart illustrating job division determination processing according to the first exemplary embodiment of the present invention.

FIG. 3 is a flowchart illustrating in detail the job division determination processing according to the present exemplary embodiment. In step S301, the job division determination unit 1133 determines whether to use the finisher attached to the printer main body. If the finisher attached to a printer main body is not used (NO in step S301), the processing proceeds to step S302.

In step S302, the job division determination unit 1133 determines whether to use a finisher external to the printer. If the job division determination unit 1133 determines to use the external finisher (YES in step S302), the processing proceeds to step S303.

In step S303, the job division determination unit 1133 determines whether a final product of the print job includes a plurality of parts (such as a front cover and middle pages). If the job division determination unit 1133 determines that the final product of the print job includes a plurality of parts (YES in step S303), the processing proceeds to step S304.

In step S304, the job division determination unit 1133 sets a job division flag to "on" to divide the job into each part. On the other hand, if the final product does not include a plurality of parts (NO in step S303), the processing proceeds to step S305. In step S305, since the job is not to be divided, the job division determination unit 1133 sets a job division flag to "off".

Returning to FIG. 2, in step S204, the job generation control unit 1131 checks the job division flag. If the job division flag is "on" (ON in step S204), the job generation control unit 111 transmits the undivided job to the part job generation unit 1134. In step S205, the part job generation unit 1134 generates part jobs by dividing the undivided job into a plurality of jobs for each part. Further, the part job generation unit 1134 stores the job information of each part job in the internal storage device.

In step S206, the job generation control unit 1131 sets the discharge destination for each part job and adds the discharge destination to the job information corresponding to each part job which is stored in the internal storage device. For example, a discharge port of a front cover part is set to the discharge unit 1 (1111), and a discharge port of a middle page part is set to the discharge unit 2 (1112). The parts are thus generated.

Figure 4:
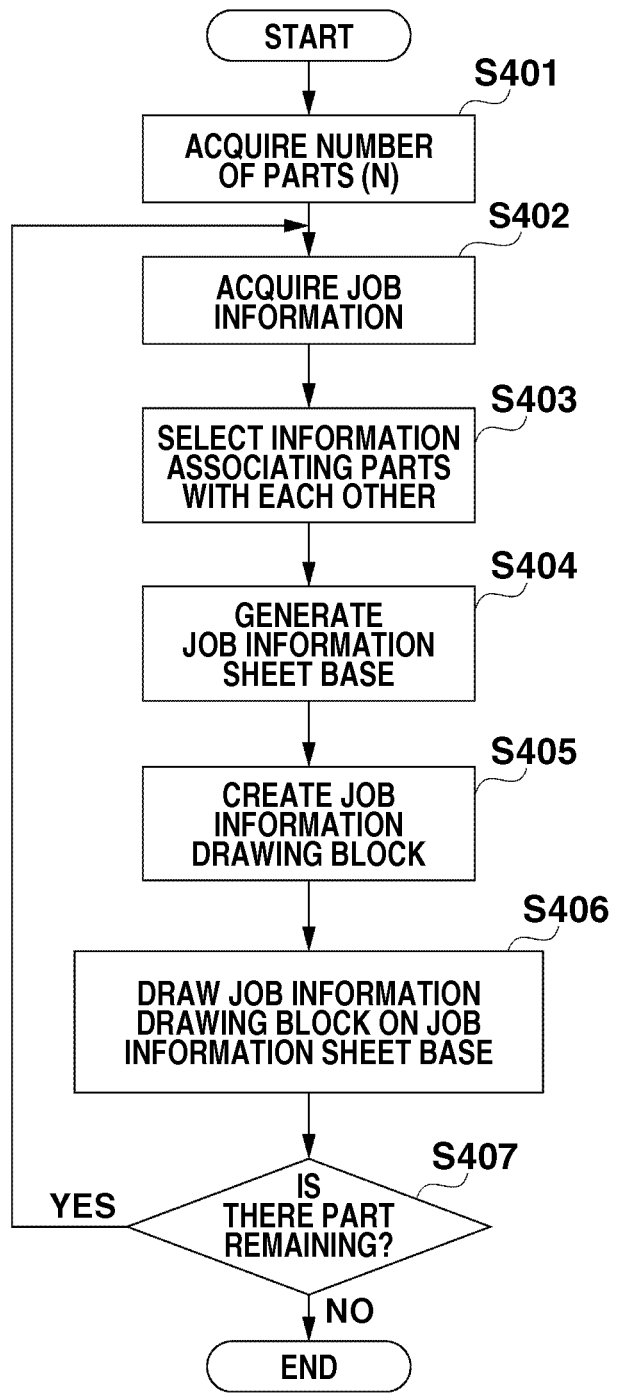
FIG. 4 is a flowchart illustrating processing for creating a job information sheet of a part (hereinafter referred to as a part job information sheet) according to the first exemplary embodiment of the present invention.
Figure 13A:
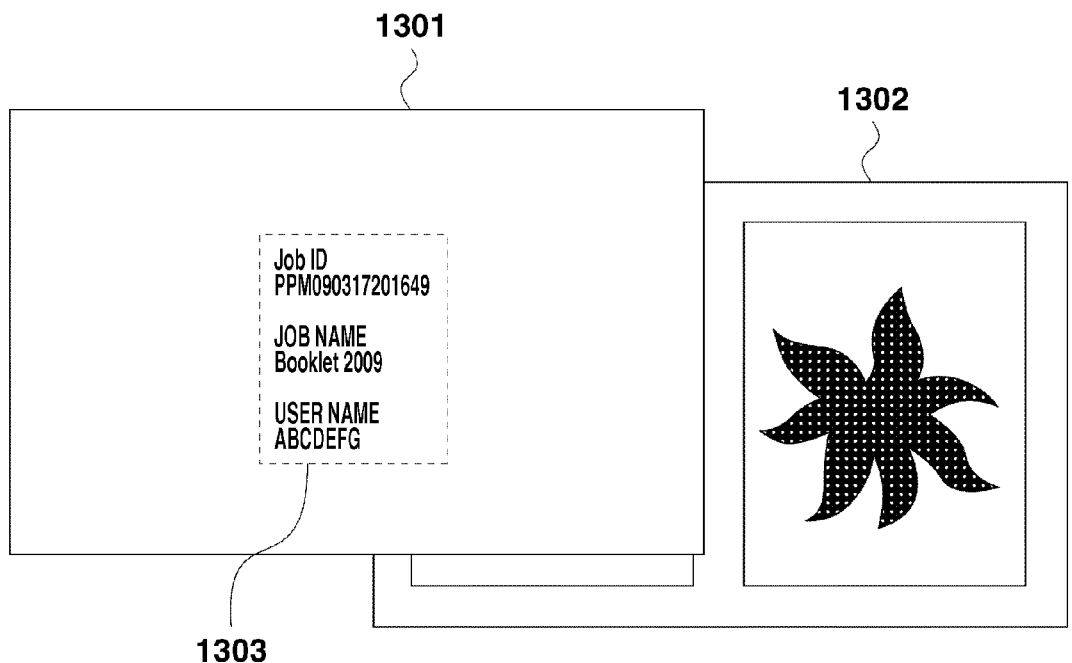
FIG. 13A illustrates an example of an output result of a front cover part job information sheet and a front cover part according to the first exemplary embodiment of the present invention.
Figure 13B:
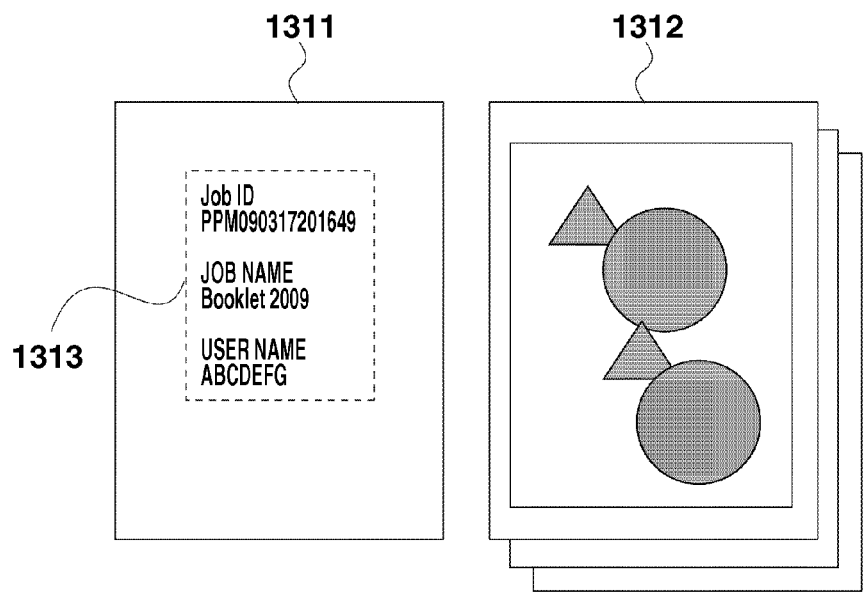
FIG. 13B illustrates an example of an output result of a middle page part job information sheet and a middle page part according to the first exemplary embodiment of the present invention.

The job information sheet creation unit 1135 then creates a part job information sheet for each part. FIG. 4 is a flowchart illustrating processing for creating the part job information sheet according to the present exemplary embodiment. FIG. 13A illustrates an example of the job information sheet of the front cover part, and FIG. 13B illustrates an example of the job information sheet for the middle page part.

Referring to FIG. 4, in step S401, the job information sheet creation unit 1135 acquires a number of the parts (N) and stores it in the internal storage device. In step S402, the job information sheet creation unit 1135 acquires the job information of each part job from the internal storage device. In step S403, the job information sheet creation unit 1135 selects information which associates the parts with each other from the acquired part job information pieces. For example, the job information sheet creation unit 1135 selects the job ID, the job name, the user name, and the bar coded data of the job ID as the information which associates the parts with each other.

In step S404, the job information sheet creation unit 1135 creates a blank sheet image (i.e., image 1301 illustrated in FIG. 13A and image 1311 illustrated in FIG. 13B) of the same size as the output paper size of the part job as a base of the job information sheet.

In step S405, the job information sheet creation unit 1135 creates a job information drawing block (i.e., block 1303 illustrated in FIG. 13A and block 1313 illustrated in FIG. 13B) in which the selected job information is formed into an image in a rectangular area. The job information sheet creation unit 1135 creates the job information drawing block for printing the information which associates the parts with each other.

In step S406, the job information sheet creation unit 1135 then draws the job information drawing block on the job information sheet base. The job information sheet creation unit 1135 performs the above described processing for all of the parts.

Returning to FIG. 2, in step S208, the job generation control unit 1131 determines the discharge port for each of the part job information sheets and an order of outputting each of the part jobs and the part job information sheets. The discharge port of each job information sheet is set to the same discharge port as the corresponding part job. For example, if the front cover and the middle page are discharged to the discharge port 1 and the discharge port 2 respectively, the job generation control unit 1131 performs control so that the job information sheet corresponding to the front cover is discharged to the discharge port 1 and the job information sheet corresponding to the middle page is discharged to the discharge port 2.

Regarding the output order, it is preferable for the part job and the job information sheet of the part job to be continuously printed. More specifically, printing is performed in the order of the front cover print job, the front cover job information sheet, the middle page print job, and the middle page job information sheet. The job generation control unit 1131 then transmits each part job and the corresponding part job information sheet to the job output unit 1136 according to the output order. In step S209, the job output unit 1136 outputs to the printer and the printer controller the print job of each of the part jobs and the part job information sheets in the order that the jobs are received from the job generation control unit 1131.

Figure 2:
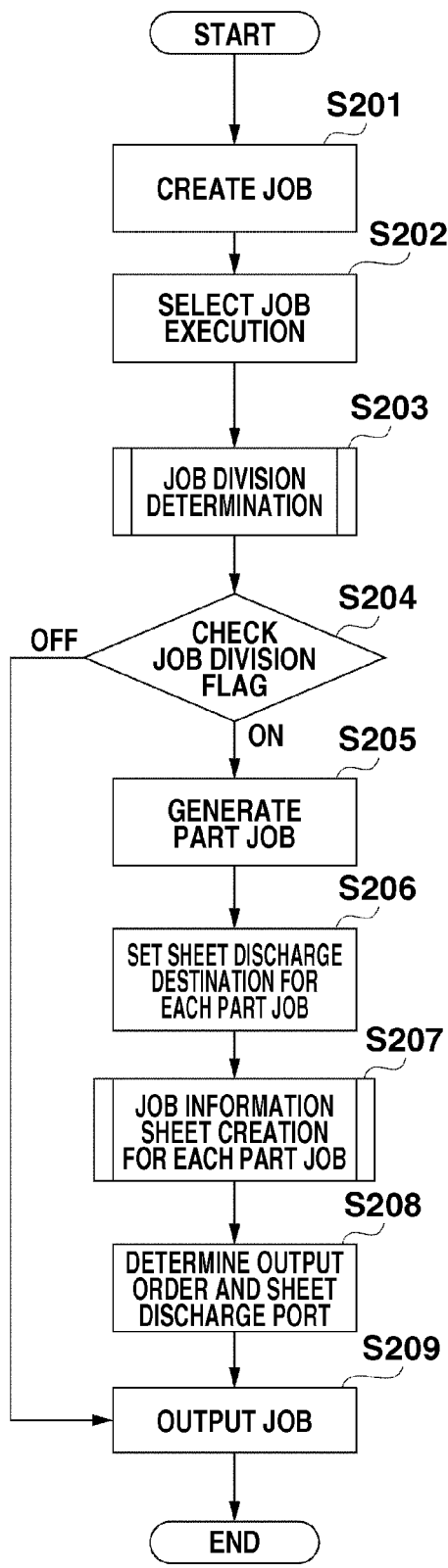
FIG. 2 illustrates a main flowchart according to a first exemplary embodiment of the present invention.

If the documents illustrated in FIG. 12 are processed according to the flowcharts illustrated in FIGS. 2, 3, and 4, the results illustrated in FIGS. 13A and 13B are acquired. By performing the above described processing, print products are output by part such as the front cover part and the middle page part, so that the operator can easily determine whether each of the printed products is output according to the same print instruction. As a result, errors can be reduced when the operator conveys the printed products to the finisher.

According to the first exemplary embodiment, the print control apparatus 1102 prints, when creating the part job information sheet, character string information and code information on the job information sheet as information indicating that the part jobs are related to each other. However, if printing of the part job and the part job information sheet is interrupt with another job, it is necessary for an operator to match the part with the corresponding part job information sheet.

According to a second exemplary embodiment, contents of a top page of each part job are drawn as a background on each job information sheet. Such part job information sheet creation processing will be described below with reference to a flowchart illustrated in FIG. 5. Each of the steps in the flowchart of the processing performed by the print control unit 1102 is stored as a program in a storage unit such as the RAM, the ROM, or the HDD and is executed by the CPU 135.

Figure 5:
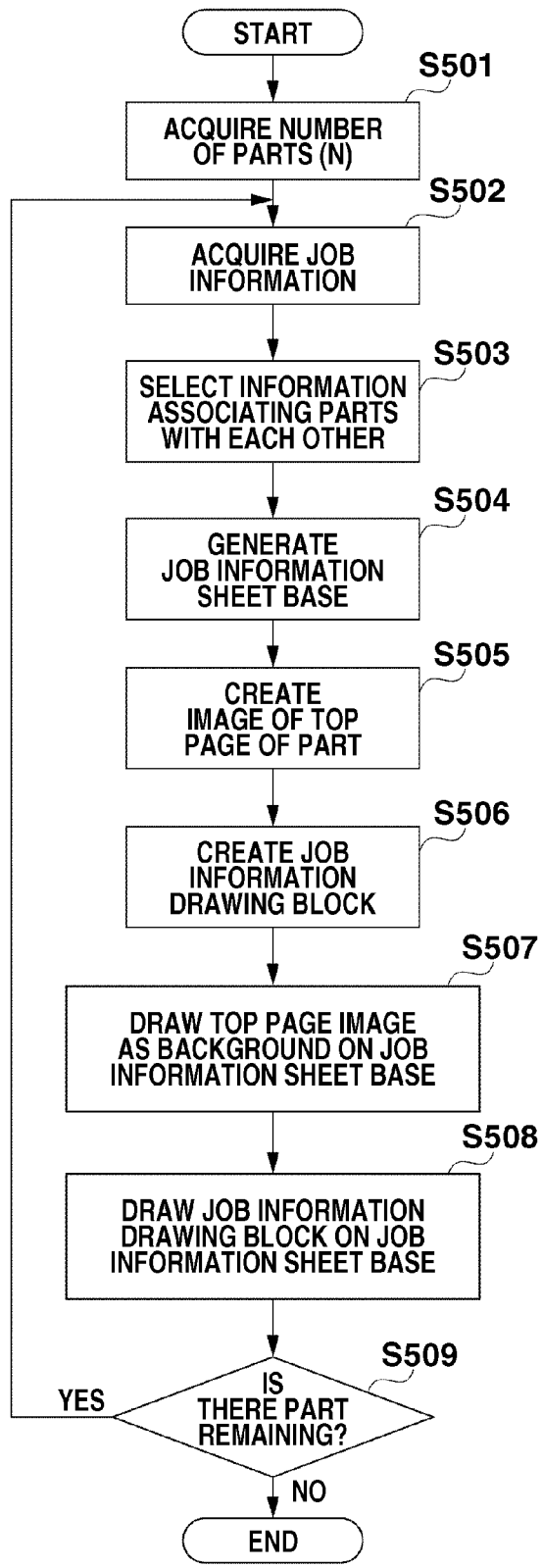
FIG. 5 is a flowchart illustrating processing for creating a part job information sheet according to a second exemplary embodiment of the present invention.

Referring to FIG. 5, since step S501 to step S504 are similar to step S401 to step S404 illustrated in FIG. 4, description thereof will be omitted. In step S505, the job information sheet creation unit 1135 acquires the content of the top page of the part and creates an image thereof. In step S506, the job information sheet creation unit 1135 creates the job information drawing block (block 1303 illustrated in FIG. 13A and block 1313 illustrated in FIG. 13B) in which the selected job information is formed into an image in a rectangular area. The job information sheet creation unit 1135 creates the job information drawing block for printing the information which associates the parts with each other.

In step S507, the job information sheet creation unit 1135 draws the image of the top page as the background overlapping the job information sheet base. In step S508, the job information sheet creation unit 1135 further draws the job information drawing block overlapping the job information sheet base. The job information sheet creation unit 1135 performs the above described processing for all of the parts.

Figure 14A:
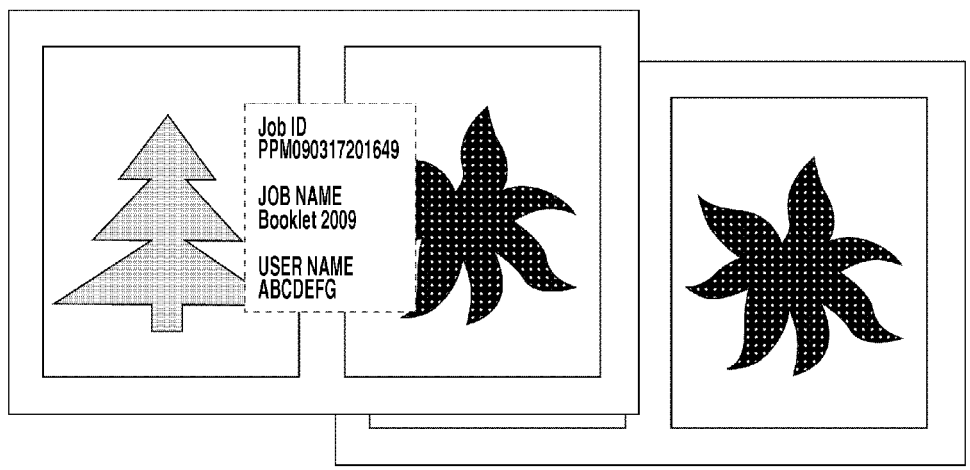
FIG. 14A illustrates an example of an output result of a front cover part job information sheet and a front cover part according to the second exemplary embodiment of the present invention.
Figure 14B:
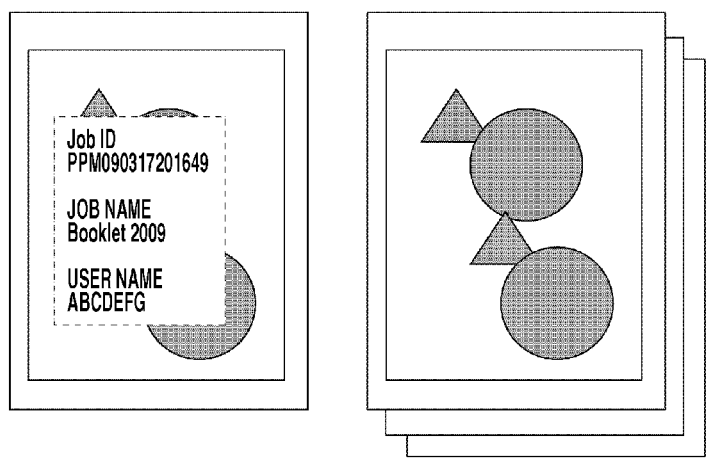
FIG. 14B illustrates an example of an output result of a middle page part job information sheet and a middle page part according to the second exemplary embodiment of the present invention.

Since the processing in other steps is similar to the processing illustrated in FIG. 2 and FIG. 3, description thereof will be omitted. If the documents illustrated in FIG. 12 are processed according to the flowcharts illustrated in FIGS. 2, 3, and 4, the results illustrated in FIGS. 14A and 14B are acquired. By performing the above described processing, the operator can easily match the part and the corresponding part job information sheet and reduce errors.

According to the first exemplary embodiment, the print control apparatus 1102 prints, when creating the part job information sheet, character string information and code information on the job information sheet as information indicating that the part jobs are related to each other. However, if the paper size is smaller than the area in which the job information is printed, the job information may become omitted.

According to a third exemplary embodiment, the part job information sheet is created to adjust the size of the job information drawing block according to the paper size. Such processing will be described below with reference to flowcharts illustrated in FIGS. 6 and 7. Each of the steps in the flowcharts of the processing performed by the print control unit 1102 is stored as a program in a storage unit such as the RAM, the ROM, or the HDD and is executed by the CPU 135.

Figure 6:
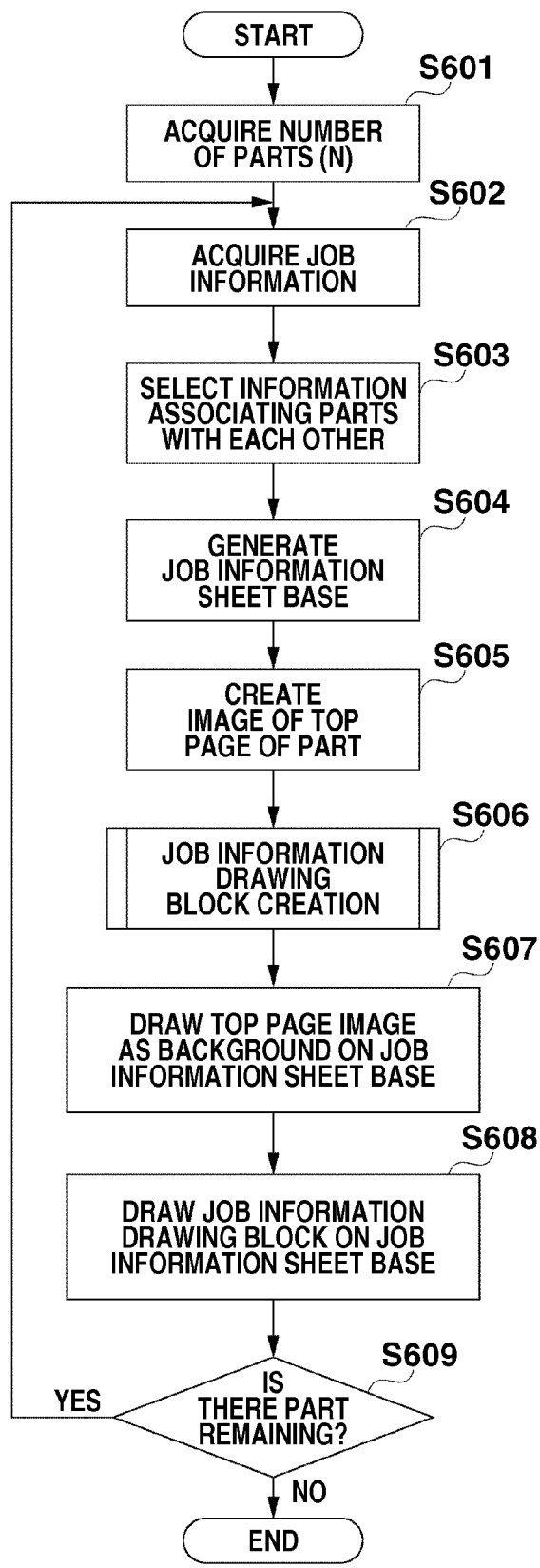
FIG. 6 is a flowchart illustrating processing for creating a part job information sheet according to a third exemplary embodiment of the present invention.

Referring to FIG. 6, since step S601 to step S605 and step S607 to step S609 are similar to step S501 to step S505 and step S507 to step S509 illustrated in FIG. 5, description thereof will be omitted. In step S606, the job information sheet creation unit 1135 creates the job information drawing block and in which the selected job information is formed into an image in a rectangular area while adjusting the size thereof. The job information sheet creation unit 1135 creates the job information drawing block for printing the information which associates the parts with each other.

Figure 7:
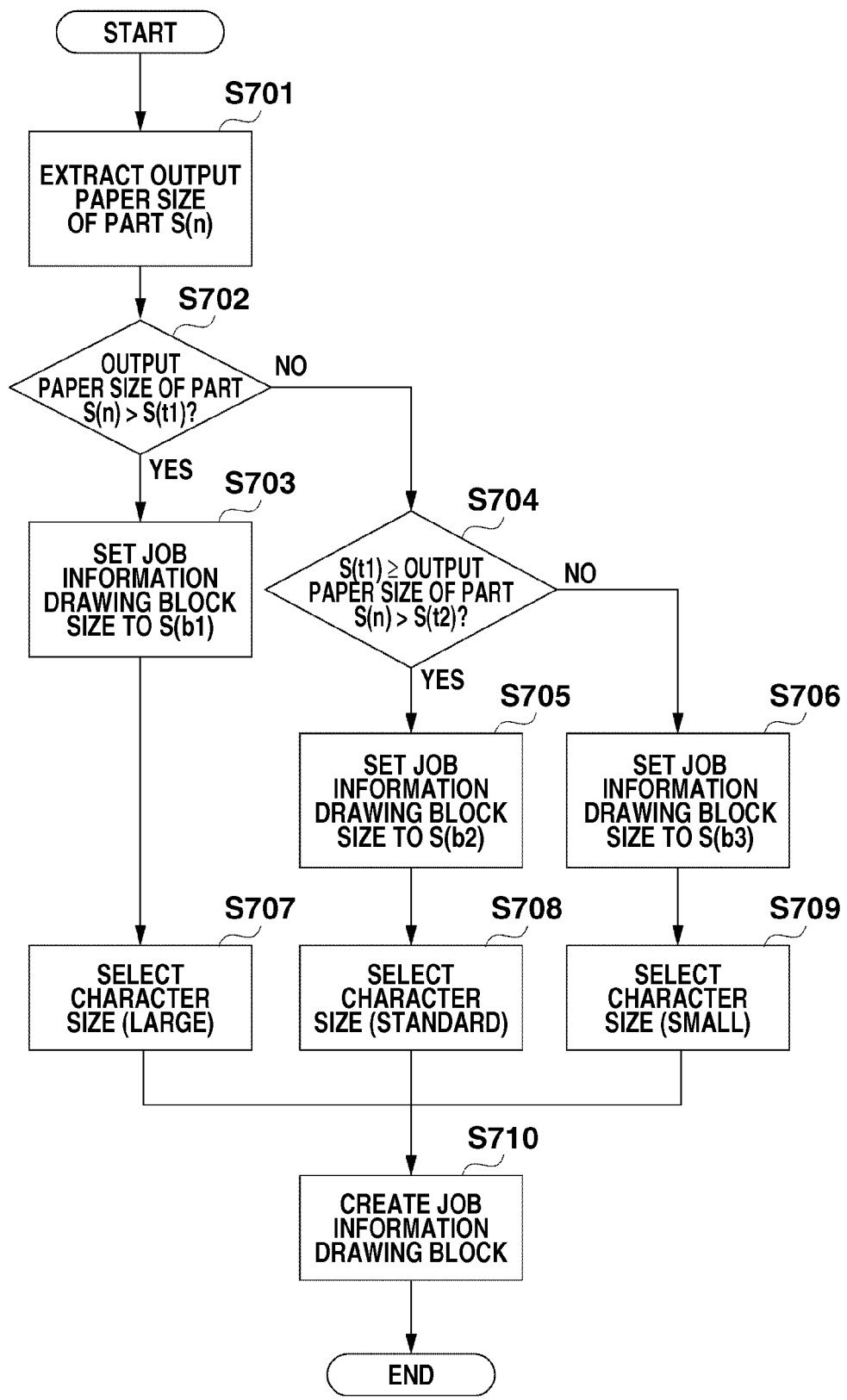
FIG. 7 is a flowchart illustrating processing for creating a job information drawing block according to the third exemplary embodiment of the present invention.

FIG. 7 is a flowchart illustrating job information drawing block creation processing in detail according to the present exemplary embodiment. In step S701, the job information sheet creation unit 1135 extracts an output paper size of the part (S (n)) from the acquired part job information. In step S702, the job information sheet creation unit 1135 compares the output paper size of the part (S(n)) with a first threshold value S(t1). If the output paper size of the part (S(n)) is greater than the first threshold value S(t1) (YES in step S702), the processing proceeds to step S703. In step S703, the job information sheet creation unit 1135 selects a predetermined rectangular area size S(b1) as a size of the job information drawing block.

In step S707, the job information sheet creation unit 1135 then selects a character size (large) according to the rectangular area size selected as described above.

If the output paper size of the part (S(n)) is less than or equal to the first threshold value S(t1) (NO in step S702), the processing proceeds to step S704. In step S704, the job information sheet creation unit 1135 compares the output paper size of the part (S(n)) with a second threshold value S (t2). If the output paper size of the part (S(n)) is greater than the second threshold value S(t2) (YES in step S704), the processing proceeds to step S705. In step S705, the job information sheet creation unit 1135 selects a predetermined rectangular area size S(b2) as a size of the job information drawing block.

In step S708, the job information sheet creation unit 1135 selects a character size (standard) according to the rectangular area size selected as described above.

On the other hand, if the output paper size of the part (S (n)) is less than or equal to the second threshold value S(t2) (NO in step S704), the processing proceeds to step S706. In step S706, the job information sheet creation unit 1135 selects a predetermined rectangular area size S(b3) as a size of the job information drawing block. In step S709, the job information sheet creation unit 1135 selects a character size (small) according to the rectangular area size selected as described above.

In step S710, the job information sheet creation unit 1135 creates the job information drawing block in which the job information is drawn as an image by the selected character size in the selected rectangular area size.

Figure 15A:
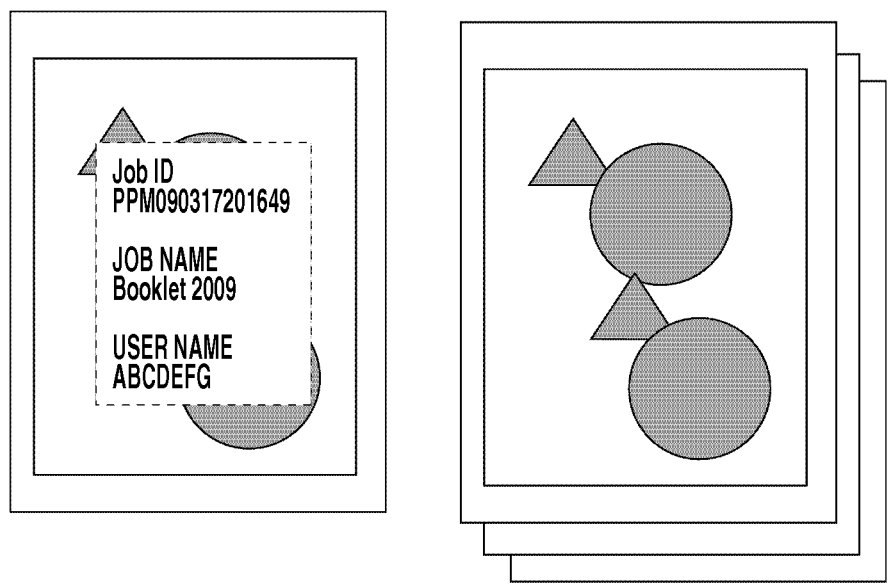
FIG. 15A illustrates an example of an output result of a middle page part job information sheet and a middle page part when a paper size S(n) is greater than S(t2) according to the third exemplary embodiment of the present invention.
Figure 15B:
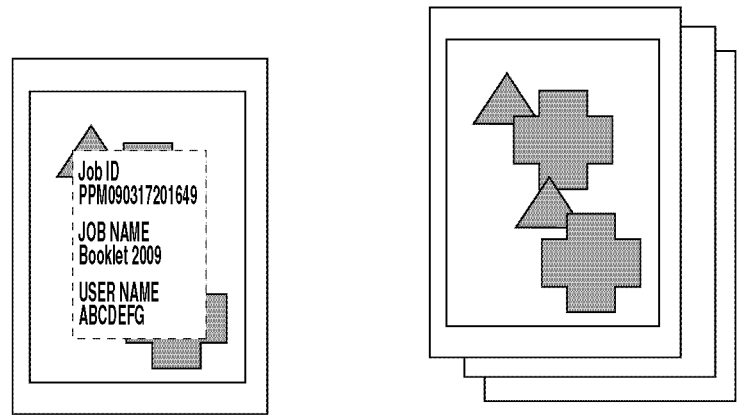
FIG. 15B illustrates an example of an output result of a middle page part job information sheet and a middle page part when a paper size S(n) is less than S(t2) according to the third exemplary embodiment of the present invention.

Since the processing in other steps is similar to the processing illustrated in FIG. 2 and FIG. 3, description thereof will be omitted. If the documents illustrated in FIG. 12 are processed according to the flowcharts illustrated in FIGS. 2, 3, 6, and 7, the results illustrated in FIGS. 15A and 15B are acquired. By performing the above described processes, omission of the job information can be prevented when the paper size is smaller than the area in which the job information is printed.

According to the second exemplary embodiment, the print control apparatus 1102 prints, when creating the part job information sheet, the character string information and the code information and draws the content of the top page of each part job as the background on the job information sheet. However, if an operator uses a preprint sheet on which a predetermined part is previously printed by another printer, the operator can directly convey such a preprint sheet to the finisher. Therefore, it is not necessary to print the part corresponding to the part previously printed on the preprint sheet when remaining parts are printed.

According to a fourth exemplary embodiment, the part job information sheet is created for determining, when the preprint sheet is used on which a predetermined part is printed, whether it is necessary to print the part job and the job information sheet thereof corresponding to the preprint sheet. Such creation processing will be described below with reference to a flowchart illustrated in FIG. 8. Each of the steps in the flowchart of the processing performed by the print control unit 1102 is stored as a program in a storage unit such as the RAM, the ROM, or the HDD and is executed by the CPU 135.

Figure 8:
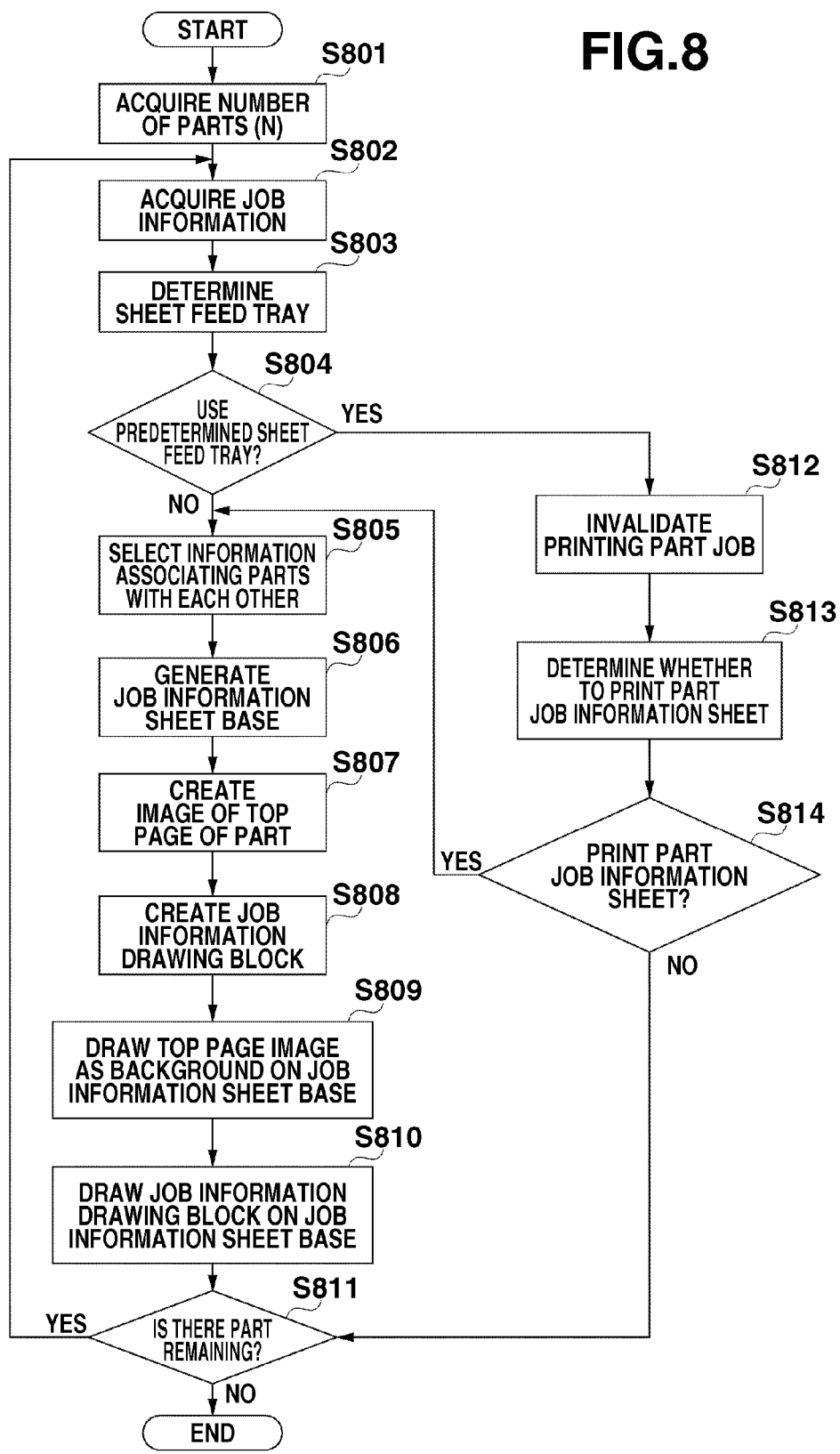
FIG. 8 is a flowchart illustrating processing for creating a part job information sheet according to a fourth exemplary embodiment of the present invention.

Referring to FIG. 8, since step S801 and step S802 are similar to step S501 and step S502 illustrated in FIG. 5, description thereof will be omitted. In step S803, the job information sheet creation unit 1135 extracts paper feed tray information of the part from the acquired job information and determines whether a predetermined paper feed tray is designated. If the predetermined paper feed tray is designated (YES in step S804), the processing proceeds to step S812. In step S812, the job generation control unit 1131 invalidates printing of the part job. According to the present exemplary embodiment, if the sheet for printing the part job is designated to be fed from an inserter, for example, the job information sheet creation unit 1135 invalidates printing of the part job.

In step S813, the job information sheet creation unit 1135 determines whether it is necessary to print the part job information sheet. If the job information sheet creation unit 1135 determines that it is not necessary to print the pat job information sheet (NO in step S814), the processing proceeds to step S811. In step S811, the job information sheet creation unit 1135 determines whether there is a remaining part. According to the present exemplary embodiment, if printing of the part job is invalidated, for example, the job information sheet creation unit 1135 determines that it is not necessary to print the part job information sheet. On the other hand, if the job information sheet creation unit 1135 determines that it is necessary to print the job information sheet (YES in step S814), the processing proceeds to step S805. The creation of the part job information sheet is then continued from step S805 to step S811. Since step S805 to step S811 are similar to step S503 to step S509 illustrated in FIG. 5, description thereof will be omitted.

The job information sheet creation unit 1135 performs the above described processing for all of the parts. Since the processing in other steps are similar to the processing illustrated in FIG. 2 and FIG. 3, description thereof will be omitted. According to the above described processing, if an operator directly conveys to the finisher the preprint sheet on which the predetermined part is printed, unnecessary printing of the part job and the job information sheet thereof corresponding to the part on the preprint sheet can be prevented.

According to the first exemplary embodiment, the print control apparatus 1102 prints, when creating the part job information sheet, character string information and code information on the job information sheet as information indicating that the part jobs are related to each other. However, if a plurality of print jobs that are not related to each other is output, it is necessary for an operator to determine the relation between the print jobs of the parts based on the character string information and the code information.

According to a fifth exemplary embodiment, a reduced image of the top page of the part related to each part job is added to the job information sheet. Processing for creating such a job information sheet will be described below with reference to FIGS. 9 and 10. Each of the steps in the flowchart of the processing performed by the print control unit 1102 is stored as a program in a storage unit such as the RAM, the ROM, or the HDD and is executed by the CPU 135.

Figure 9:
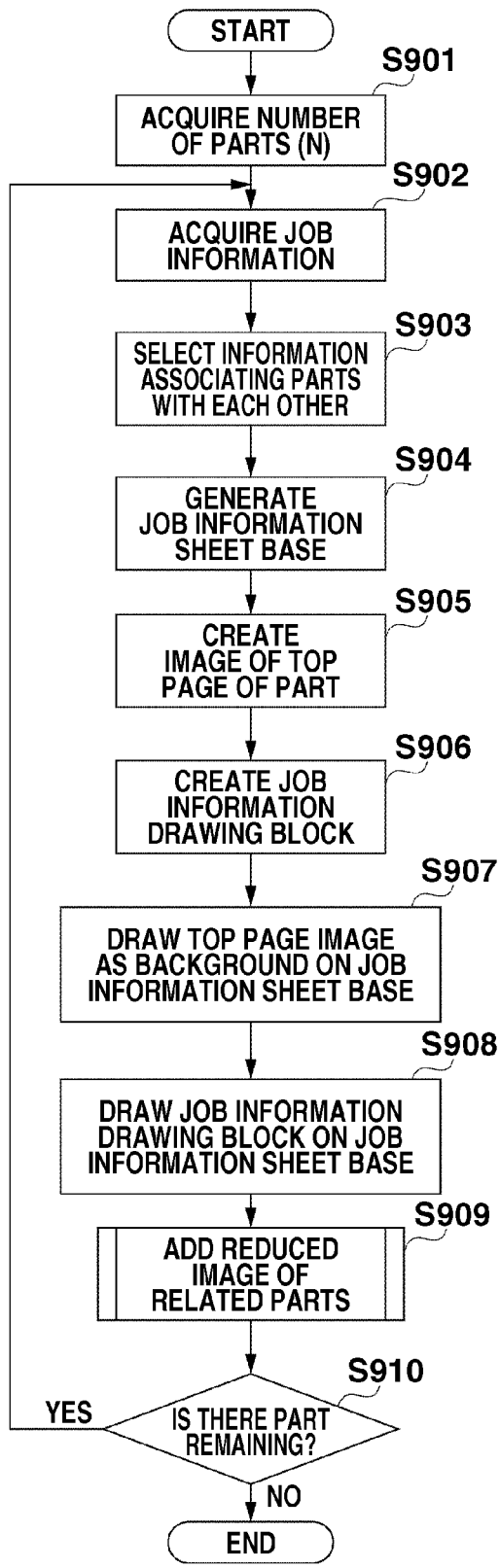
FIG. 9 is a flowchart illustrating processing for creating a part job information sheet according to a fifth exemplary embodiment of the present invention.

Referring to FIG. 9, since step S901 to step S908 are similar to step S501 to step S508 illustrated in FIG. 5, description thereof will be omitted. In step S909, the job information sheet creation unit 1135 adds a reduced image of the top page of a related part to the job information sheet.

Figure 10:
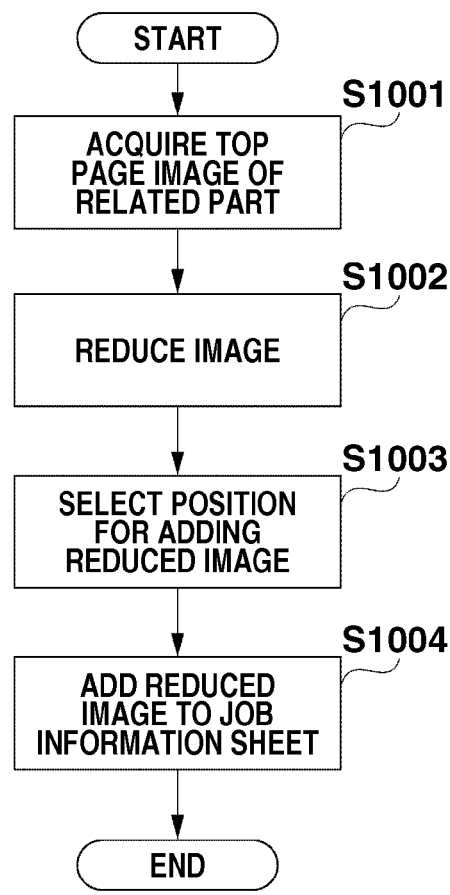
FIG. 10 is a flowchart illustrating processing for adding a reduced image of a related part according to the fifth exemplary embodiment of the present invention.

FIG. 10 is a flowchart illustrating processing for adding the reduced image of the related part. In step S1001, the job information sheet creation unit 1135 acquires the image of the top page of the related part. In step S1002, the job information sheet creation unit 1135 reduces the acquired image of the top page of the related part at a predetermined ratio. In step S1003, the job information sheet creation unit 1135 then selects a position on which the generated reduced image is added to the job information sheet. According to the present exemplary embodiment, the largest blank area is selected from areas above, below, right, or left of the job information block. In step S1004, job information sheet creation unit 1135 draws the reduced image overlapping the selected position in the job information sheet.

Figure 16A:
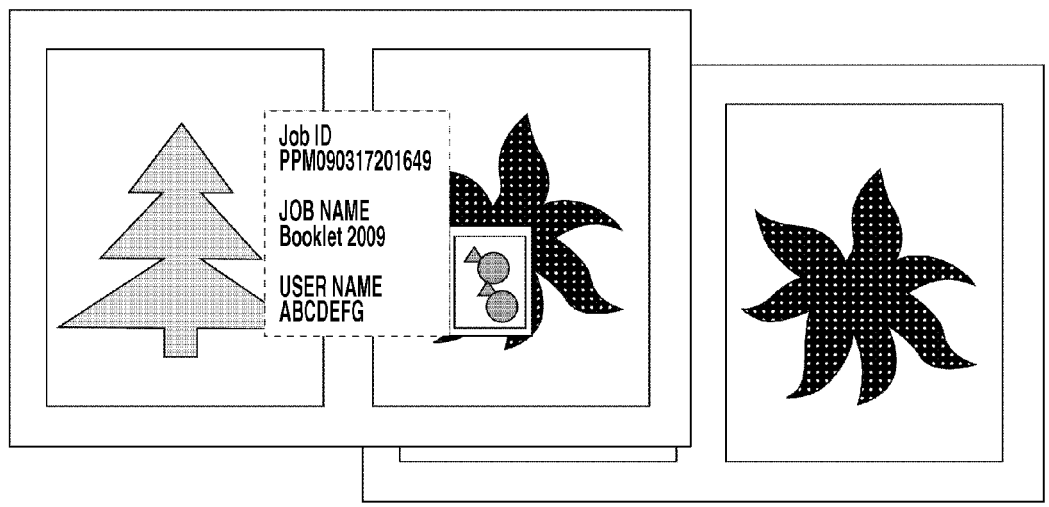
FIG. 16A illustrates an example of an output result according to the fifth exemplary embodiment of the present invention.
Figure 16B:
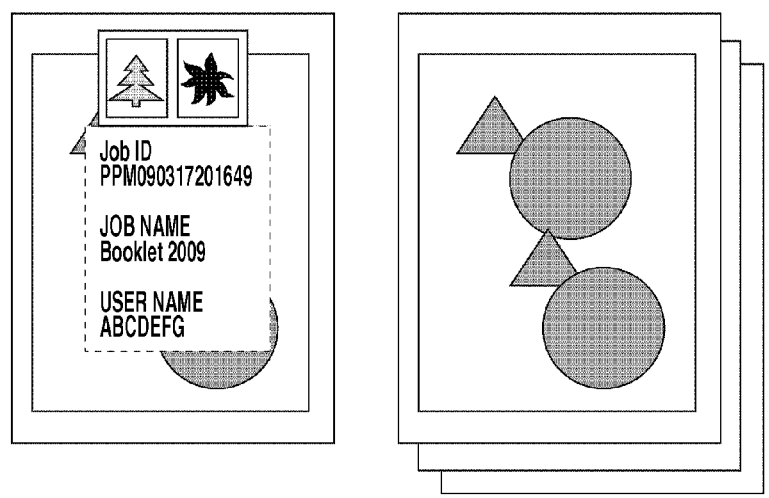
FIG. 16B illustrates an example of an output result of a middle page part job information sheet and a middle page part according to the fifth exemplary embodiment of the present invention.

The job information sheet creation unit 1135 performs the above described processing for all of the parts. Since the processing in other steps are similar to the processing illustrated in FIG. 2 and FIG. 3, description thereof will be omitted. If the documents illustrated in FIG. 12 are processed according to the flowcharts illustrated in FIGS. 2, 3, 9, and 10, the results illustrated in FIGS. 16A and 16B are acquired. By performing the above described processing, an operator can easily determine, when a plurality of print jobs that are not related to each other is output, relationship between the job parts. As a result, determination errors can be reduced.

Aspects of the present invention can also be realized by a computer of a system or apparatus (or devices such as a CPU or MPU) that reads out and executes a program recorded on a memory device to perform the functions of the above described embodiment (s), and by a method, the steps of which are performed by a computer of a system or apparatus by, for example, reading out and executing a program recorded on a memory device to perform the functions of the above described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-129197 filed May 28, 2009, which is hereby incorporated by reference herein in its entirety.

What is claimed is:

1. A print control apparatus comprising:
a print job generation unit configured to generate a print job, wherein a final product of the print job comprises a plurality of print parts, wherein the print job generation unit is further configured to cause one or more printers to print the plurality of print parts, and to control the one or more printers to output at least a first one of the plurality of print parts to a first sheet discharge unit and to output at least a second one of the plurality of print parts to a second sheet discharge unit different from the first sheet discharge unit according to a print instruction;
a job information sheet creation unit configured to create, for each of the plurality of print parts, a job information sheet of the print part, wherein an image of a second print part is added to the job information sheet of a first print part such that the second print part which is different from the first print part is identifiable, and an image of the first print part is added to the job information sheet of the second print part such that the first print part is identifiable; and
a sheet discharge control unit configured to control the one or more printers so that each of the job information sheets is discharged to a sheet discharge unit to which a print part corresponding to the job information sheet is discharged.

2. The print control apparatus according to claim 1, wherein the print job generation unit is configured to divide the print job into one or more print jobs for each of the plurality of print parts.

3. The print control apparatus according to claim 2, further comprising a unit for determining whether to use a finisher external to the printer and determining based on a determination result whether it is necessary to divide the print job.

4. The print control apparatus according to claim 1, wherein the job information sheet creation unit includes a selection unit configured to acquire job information of each of the print parts and to select from the acquired job information, information indicating that the print part concerned is related to at least one other print part.

5. The print control apparatus according to claim 1, wherein the job information sheet creation unit is configured to create the job information sheet for each print part by setting an image of a page of the print part concerned as a background image on the job information sheet.

6. The print control apparatus according to claim 1, wherein the job information sheet creation unit is configured to adjust a size of an area on which job information is printed according to a paper size.

7. The print control apparatus according to claim 1, further comprising a unit for determining whether to use an inserter of the one or more printers and determining based on a determination result whether it is necessary to create a job information sheet for a particular print part.

8. A method for controlling printing comprising:
generating a print job comprising a plurality of print parts constituting a final product of the print job;
causing one or more printers to print the plurality of print parts;
controlling the one or more printers to output at least a first one of the plurality of print parts to a first sheet discharge unit and to output at least a second one of the plurality of print parts to a second sheet discharge unit different from the first sheet discharge unit according to a print instruction;
creating, for each of the plurality of print parts, a job information sheet of the print part, wherein an image of a second print part is added to the job information sheet of a first print part such that the second print part which is different from the first print part is identifiable, and an image of the first print part is added to the job information sheet of the second print part such that the first print part is identifiable; and
controlling the one or more printers so that each of the job information sheets is discharged to a sheet discharge unit to which a print part corresponding to the job information sheet is discharged.

9. A non-transitory computer-readable storage medium storing a computer-executable process, the computer-executable process causing a computer to implement a method for controlling printing comprising:
generating a print job comprising a plurality of print parts constituting a final product of the print job;
causing one or more printers to print the plurality of print parts;

controlling the one or more printers to output at least a first one of the plurality of print parts to a first sheet discharge unit and to output at least a second one of the plurality of print parts to a second sheet discharge unit different from the first sheet discharge unit according to a print instruction;

creating, for each of the plurality of print parts, a job information sheet of the print part, wherein an image of a second print part is added to the job information sheet of a first print part such that the second print part which is different from the first print part is identifiable, and an image of the first print part is added to the job information sheet of the second print part such that the first print part is identifiable; and controlling the one or more printers so that each of the job information sheets is discharged to a sheet discharge unit to which a print part corresponding to the job information sheet is discharged.

* * * * *